United States Patent [19]
Jennato et al.

[11] Patent Number: 5,923,118
[45] Date of Patent: Jul. 13, 1999

[54] NEON GAS DISCHARGE LAMP PROVIDING WHITE LIGHT WITH IMPROVED PHOSPHER

[75] Inventors: Scott D. Jennato, Candia, N.H.; Anthony F. Kasenga, Towanda, Pa.

[73] Assignee: Osram Sylvania Inc., Danvers, Mass.

[21] Appl. No.: 08/814,177

[22] Filed: Mar. 7, 1997

[51] Int. Cl.$^6$ ........................................... G09G 3/10
[52] U.S. Cl. ........................................... 313/485; 315/246
[58] Field of Search ........................ 313/483, 484, 313/485, 486, 487

[56] References Cited

U.S. PATENT DOCUMENTS

| | | | |
|---|---|---|---|
| 4,544,997 | 10/1985 | Seuter . | |
| 4,647,821 | 3/1987 | Lapatovich et al. | 315/248 |
| 4,755,715 | 7/1988 | Berkstresser et al. | 313/468 |
| 4,871,941 | 10/1989 | Dobashi et al. | 313/485 |
| 4,882,520 | 11/1989 | Tsunekawa et al. | 313/643 |
| 5,034,661 | 7/1991 | Sakurai et al. | 315/207 |
| 5,072,155 | 12/1991 | Sakurai et al. | 315/219 |
| 5,387,837 | 2/1995 | Roelevink et al. | 343/484 |
| 5,523,655 | 6/1996 | Jennato et al. | 315/246 |
| 5,565,741 | 10/1996 | Jennato et al. | 315/246 |
| 5,666,031 | 9/1997 | Jennato et al. | 315/246 |

FOREIGN PATENT DOCUMENTS

0700074  3/1996  European Pat. Off. .

*Primary Examiner*—Vip Patel
*Assistant Examiner*—Matthew J. Gerike
*Attorney, Agent, or Firm*—William E. Meyer

[57] ABSTRACT

A neon lamp providing white light is disclosed. The lamp is operated to stimulate the neon to emit both ultraviolet light, and visible red light. A phosphor coating responsive to the ultraviolet light produces a complementary green blue light that in combination with the neon red light yields a white light. The lamp is small, efficient, and not subject to the effects of cold that cause mercury based fluorescent lamps to operate poor in cold conditions typical of out of door operation.

9 Claims, 5 Drawing Sheets

NEON GAS DISCHARGE LAMP PROVIDING WHITE LIGHT WITH IMPROVED PHOSPHER

Basic aspects of this invention are disclosed in copending applications Method of Operating a Neon Lamp, Ser. No. 8/213,649 (issued as U.S. Patent Number) filed by the present Applicant on Mar. 16, 1994; and Neon Fluorescent Lamp and Method of Operating, Ser. No. 08/298,896 (issued as U.S. Patent Number) filed by the present Applicant on Aug. 31, 1994, and the benefit of the filing date of those applications are hereby claimed for this continuation in part Application.

TECHNICAL FIELD

The invention relates to electric lamps and particularly to discharge lamps. More particularly the invention is concerned with a method of operating a low pressure neon discharge lamp to produce white light.

BACKGROUND ART

Discharge lamp colors are the result of particular atomic emissions and are adjustable by selecting different chemical compositions, and gas pressures. Possible lamp colors are then determined by the limited number of useful gases, and phosphors, where a phosphor is used. Mercury is a strong emitter of ultraviolet light and is commonly used in lamps to gain the full range of available phosphor colors. Unfortunately, mercury is limited by its range of useful operating temperatures. There are also environmental concerns about its use. Without mercury, the number of useful phosphors is reduced, and so is the number of colors that may be efficiently produced. There is a particular need for an efficient mercury free discharge lamp in combination with the proper method of operation that will generate white light.

Phosphors can have differing emissions, and efficiencies depending in part on their firing and dopants. The similar compositions, or the same composition if processed differently can give differing results. Phosphors do not respond to the shorter neon UV emissions in the same way they respond to the longer mercury UV emissions. Phosphor response to neon emission therefore cannot be determined by looking at phosphor response tables generated for mercury emissions. Also the shorter neon emissions do not pass through a glass or quartz lamp, so the phosphors cannot be tested on the exterior of a generic neon lamp. The phosphor must be inside the lamp to generate the correct response. These factors make phosphor selection and testing for use in a neon lamp inherently difficult.

DISCLOSURE OF THE INVENTION

A positive column neon discharge lamp with a phosphor coating may be operated to provide a white color by shaping the input power pulse. The power pulse is chosen to have a pulse width to excite ultraviolet photon emission from the neon, while applying otherwise sufficient voltage and current to maintain ionization of the lamp fill. The phosphor is formulated to be responsive to ultraviolet emission from neon, and to produce visible light that in combination with neon red light produces a white light.

BEST MODE FOR CARRYING OUT THE INVENTION

Figure 1:
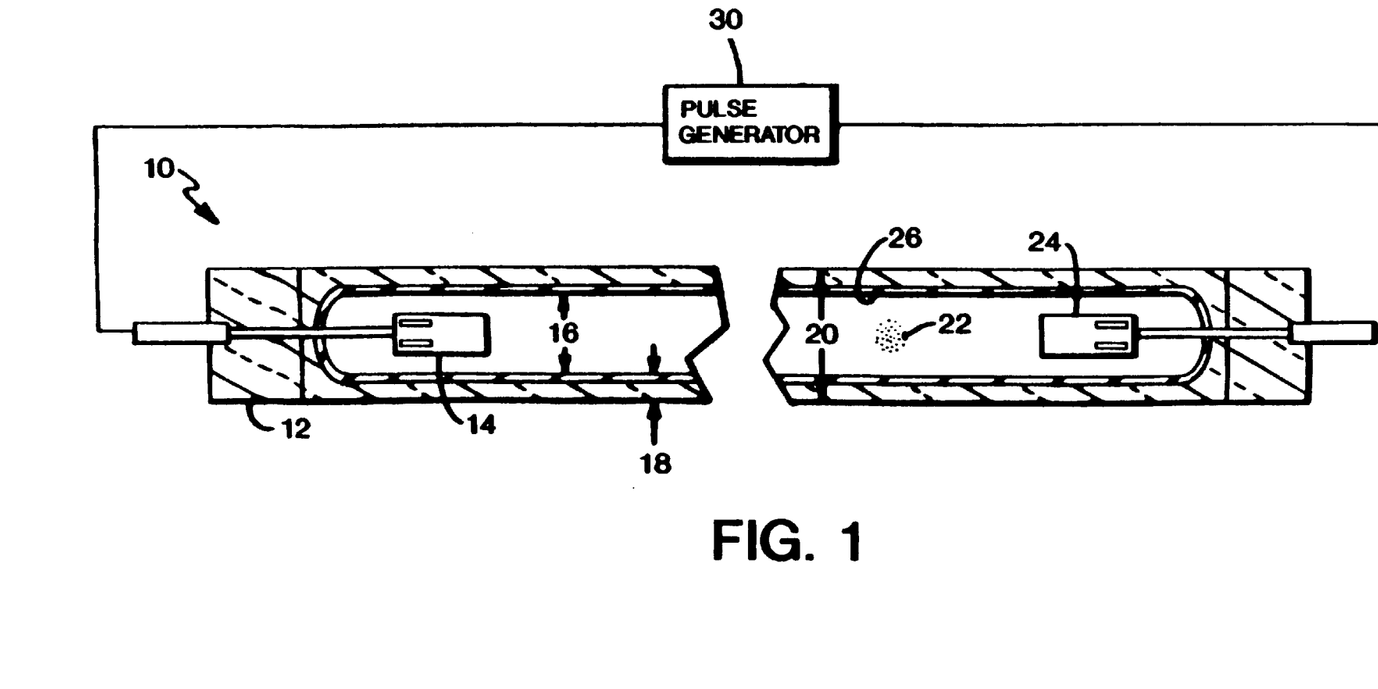
FIG. 1 shows a cross sectional view, partially broken away of a phosphor coated neon lamp and pulsed power supply.

FIG. 1 shows a cross sectional view, partially broken away of a preferred embodiment of a neon fluorescent lamp. The neon lamp 10, such as one useful as a vehicle lamp, is assembled from a tubular envelope 12, a first electrode 14, a neon gas fill 22, a second electrode 24, and a phosphor coating 26. The lamp is operated by a pulse generator 30.

The tubular envelope 12 may be made out of hard or soft glass or quartz to have the general form of an elongated tube. The selection of the envelope material is somewhat important. The preferred glass does not devitrify, or outgas at the temperature of operation, and also substantially blocks the loss of neon. One suitable glass is an alumina silicate glass, a "hard glass," available from Corning Glass Works, and known as type 1724. Applicants have found that the 1724 hard glass stops nearly all neon loss. The 1724 glass may be baked at 900 degrees Celsius to drive out water and hydrocarbons. The hot bake out improves the cleanliness that helps standardize the color produced, and improves lamp life.

Common neon sign lamps use low pressure (less than 10 Torr), and produce low intensity discharges with low brightness. The envelope tubes are made from lead, or lime glasses that are easily formed into the curved text or figures making up the desired sign. The bent tubes are then filled and sealed. These glasses if operated at the higher temperatures of a more intense discharge release the lead, or other chemical species of the glass into the envelope. The glass is then devitrified, or stained, or the gas chemistry is changed resulting in a lamp color change. Using pure quartz is not fully acceptable either, since pure quartz has a crystal structure that allows neon to diffuse through. Neon loss from the enclosed volume depends on the lamp temperature, and gas pressure, so for a higher pressure lamp, more neon is lost, resulting in a greater pressure and color change. There are additional optical and electrical changes that occur as the neon loss increases.

The envelope's 12 inside diameter 16 may vary from 2.0 to 10.0 millimeters, with the preferred inside diameter 16 being about 3.0 to 5.0 millimeters. Lamps have been found to work marginally well at 9 or 10 millimeters inside diameter. Better results occur at 5 millimeters, and 3 millimeters appears to be the best inside diameter. The preferred envelope wall thickness 18 may vary from 1.0 to 3.0 millimeters with a preferred wall thickness 18 of about 1.0 millimeter. The outside diameter 26 then may vary from 4.0 millimeters to 16.0 millimeters with a preferred outside diameter 28 of 5.0 to 7.0 millimeters. Tubular envelopes have been made with overall lengths from 7.62 centimeters to 127 centimeters (3 to 50 inches). The overall length for a positive column emission is thought to be a matter of designer choice.

At one end of the tubular envelope 12 is a first sealed end. The first sealed end entrains the first electrode 14. The preferred first sealed end is a press seal capturing the first electrode 14 in the hard glass envelope. Positioned at the opposite end of the tubular envelope 12 is a second sealed end. The second sealed end may be formed to have substantially the same structure as the first seal, capturing a similarly formed second electrode 24. It is understood that lamp 10 is to be operated as a positive column, so the electrodes are separated sufficiently to allow formation of a positive column discharge.

Electrode efficiency, and electrode durability are important to overall lamp performance. The preferred electrode is a cold cathode type with a material design that is expected to operate at a high temperature for a long lamp life. It is understood that hot cathode or electrodeless lamps may possibly be made to operate using the method of operation. A molybdenum rod type electrode may be formed to project into the enclosed envelope volume, with a cup positioned and supported around the inner end of the electrode rod. The cup may be formed from nickel rolled in the shape of a cylinder. A tantalum rod or cup type electrode is preferred for durability.

The region between the electrode tip and the inner wall of the cup may be coated or filled with an electrically conductive material that preferably has a lower work function than does the cup. The fill material is preferably an emitter composition having a low work function, and may also be a getter. The preferred emitter is an alumina and zirconium getter material, known as Sylvania 8488 that is spun deposited and baked on to provide an even coating. The cup surrounds the emitter tip, and extends slightly farther, perhaps 2.0 millimeters, into the tubular envelope than the inner most part of the electrode rod, and the emitter material extend. Emitter material, or electrode material that might sputter from the emitter tip tends to be contained in the extended cup.

The preferred neon fill 22 is substantially pure, research quality neon. The Applicants have found that purity of the neon fill, and cleanliness of the lamp are important in consistently achieving proper lamp color. Similarly, no mercury is used in the lamp. While mercury reduces the necessary starting voltage in a discharge lamp, mercury also adds a large amount of blue, and ultraviolet light to the output spectrum. Mercury based lamps are also difficult to start in cold environments, an undesirable feature for example in a vehicle lamp. While other gases, such as argon, helium, krypton, nitrogen, radon, xenon and combinations thereof, could be included in the lamp, in minor concentrations (substantially pure). Otherwise these gases quickly affect the starting conditions, operating conditions and output color. In general these other gases have lower energy bands than neon, and therefore even in small quantities, tend to either dominate the emission results, or quench the neon's production of ultraviolet and visible light. Argon and nitrogen tend to quench the neon emission, while providing their own ultra-violet emissions, in combination a white color can be produced, but at a reduced efficiency. Pure, or substantially pure neon is then the preferred neon lamp fill.

The gas fill 22 pressure affects the color output of the lamp. Lamp fill pressure may range from 10 to 300 torr. Increasing pressure shortens the time between atomic collisions, and thereby shifts the population of emitting neon species to a deeper red. By adjusting the pressure, one can then affect the red component of the lamp color. For example, at pressures below 25 Torr, the chromaticity is outside the SAE red range. At 70 Torr the neon gives an SAE acceptable red with chromaticity figures of (0.662, 0.326). At 220 Torr, the color still meets the SAE requirements, but has shifted to a deeper red with coordinates of (0.670, 0.324). With decreasing pressure the emitted light tends to be more orange.

The neon pressure also effects electrode life. At pressures of 10 Torr or less, the electrodes tend to sputter, discoloring the lamp, reducing functional output intensity, and threatening to crack the lamp by interacting the sputtered metal with the envelope wall. At pressures of 220 Torr or more, the ballast must provide a stronger electric field to move the electrons through the neon, and this is less economical. Lamps above 300 Torr of neon are felt to be less practical due to the increasing hardware and operating expense. The effect of pressure depends in part on lamp length (arc gap). The neon gas fill 22 may have a preferred pressure from 20 Torr to 220 Torr. The preferred pressure for a 15.24 centimeter (6 inch) lamp is about 100 Torr.

The lamp envelope is further coated with a phosphor 26 responsive to the ultraviolet radiation lines of neon. Several phosphors are known, and normally they are adhered to the inside surface of the lamp envelope. They may be attached to other surfaces formed in the interior of the envelope. The preferred phosphor 26 for white color, has an alumina binder and includes yttrium, alumina, gallium, and ceria. Applicants initially selected a phosphor, whose molar composition is $Y_3Al_3Ga_2O_{12}$. This provides substantially a garnet structure (YAG) with two moles of gallium substituted for two moles of aluminum. This composition shall be referred to as YAG: gallium. The YAG: gallium was further doped slightly with cerium giving $Y_3Al_3Ga_2O_{12}:Ce_{0.01}$. This composition shall be referred to as YGC. In actual testing, $Y_{2.92}Al_3Ga_2O_{12}:Ce_{0.01}$ was formed. The slight variance in the yttrium in the YGC is considered to be the result of small experimental sample error, and not considered important. Lutetium and scandium have similar valences and atomic radii as does yttrium, and Applicants believe that substitution of one or two moles of lutetium or scandium into the yttrium sites would likely yield a useful phosphor. This formulation is then $Y_aLu_bSc_c:Al_3Ga_2O_{12}:Ce_d$ (where a+b+c=3, and 0.0<d<0.1).

It is known in the art to use a trace of molybdenum (concentration of about $3.1 \times 10^{-5}$ moles to $3.1 \times 10^{-4}$ moles) to help preserve the valance state of the cerium. Applicants found no detectable effect, positive or negative, with the use of molybdenum. The use of traces of molybdenum in the formulation appears to be permitted.

The phosphor processing can be important as will be seen in the tested samples described below. Applicants found for the YGC formulations that higher processing temperatures gave better results. The thickness of the phosphor also affects the lamp color, since the lamp emission is due to the visible emissions from the neon gas and the phosphor. Increasing the phosphor thickness, increases the phosphor emission up to a saturation point. At the same time, increasing the phosphor thickness decreases the transmission of the visible neon emission. The phosphor thickness then to a degree controls the relative amount of the two emissions, and therefore the combined color. The phosphor thickness can be controlled by multiple coatings of thin layers, for example, three layers of from 15 to 20 microns per layer. The desirable phosphor coating thickness is then determined by simple testing. The gross material filtering effect of the phosphor depth is believed to be substantially the same for the similar, albeit slightly different doped phosphors. The greatest radiance was achieved in similarly phosphor coated neon lamps with coating thicknesses of about 36 microns.

The lamp may be operated by a pulse generator 30 to give white resulting from the combined phosphor and neon colors. To activate the phosphor and form the prescribed white color through the mixing of the visible neon and phosphor emissions, pulse-mode power is used. During an electrical discharge, the neon gas is excited through collisions. For low pressure neon, such as a few torr, the average time between atomic collisions is long compared to the lifetimes of the excited states. The Applicants have found that under these conditions, it is possible through electrical excitation to have some control over the relative numbers of excited neon atoms in the various excited states. By varying the relative populations in selected states, lamp color may be varied. In particular, one can increase or decrease the visible radiation in the red color regime relative to the ultraviolet radiation for phosphor stimulation.

The Applicants also found that by electrically operating a neon discharge under pulse mode excitation, as compared to sinusoidal excitation, lamp efficacy can be increased by 50 to 70 percent. Besides increasing lamp efficacy, the Applicants also observed that due to changes in the relative intensity of visible spectrum emission lines, the chromaticity of the lamp changes. When the excitation pulse widths were narrowed, the red neon component of the lamp color shifted away from the red towards the orange.

Figure 2A:
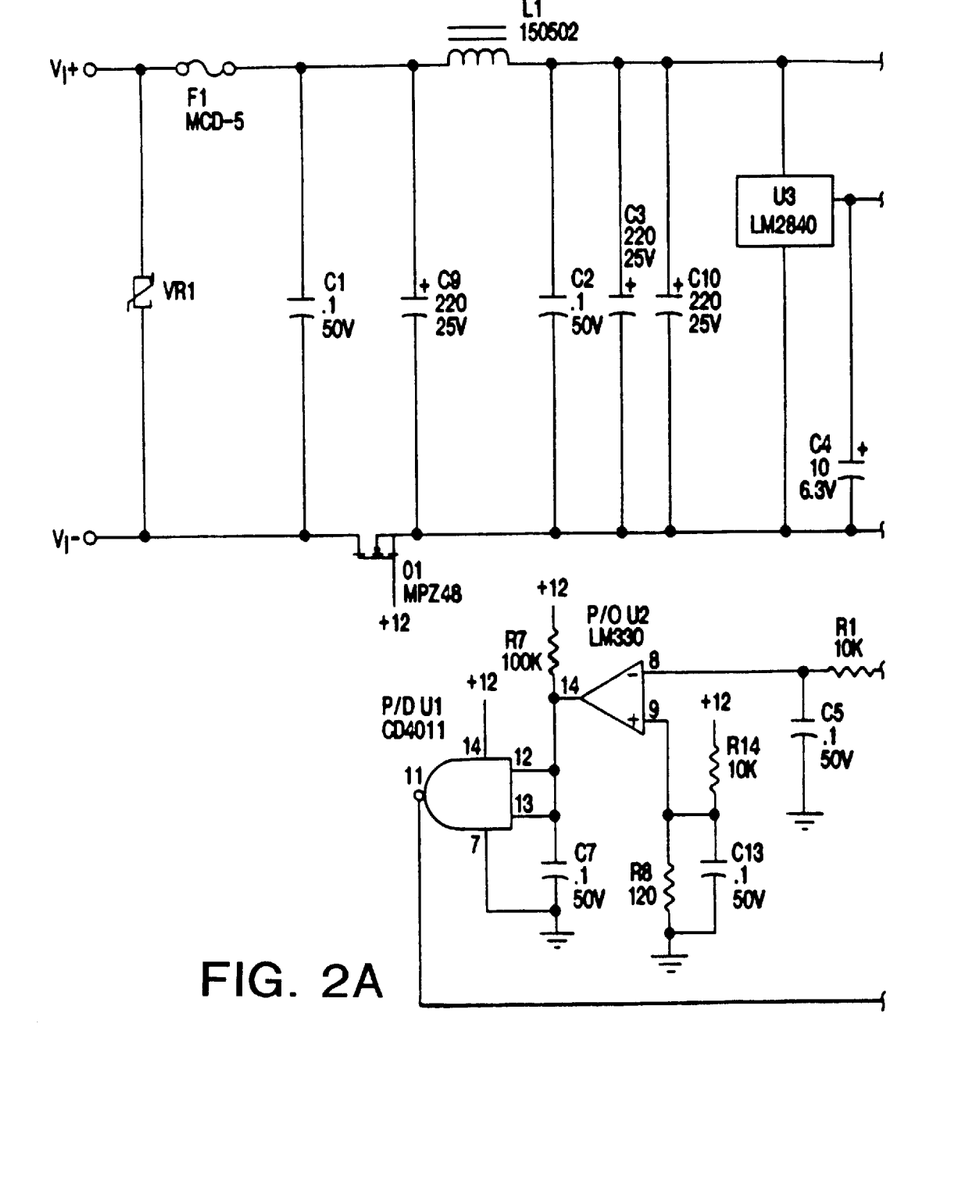
FIGS. 2A and 2B show a circuit diagram for a 25 watt pulsed power source.
Figure 2B:
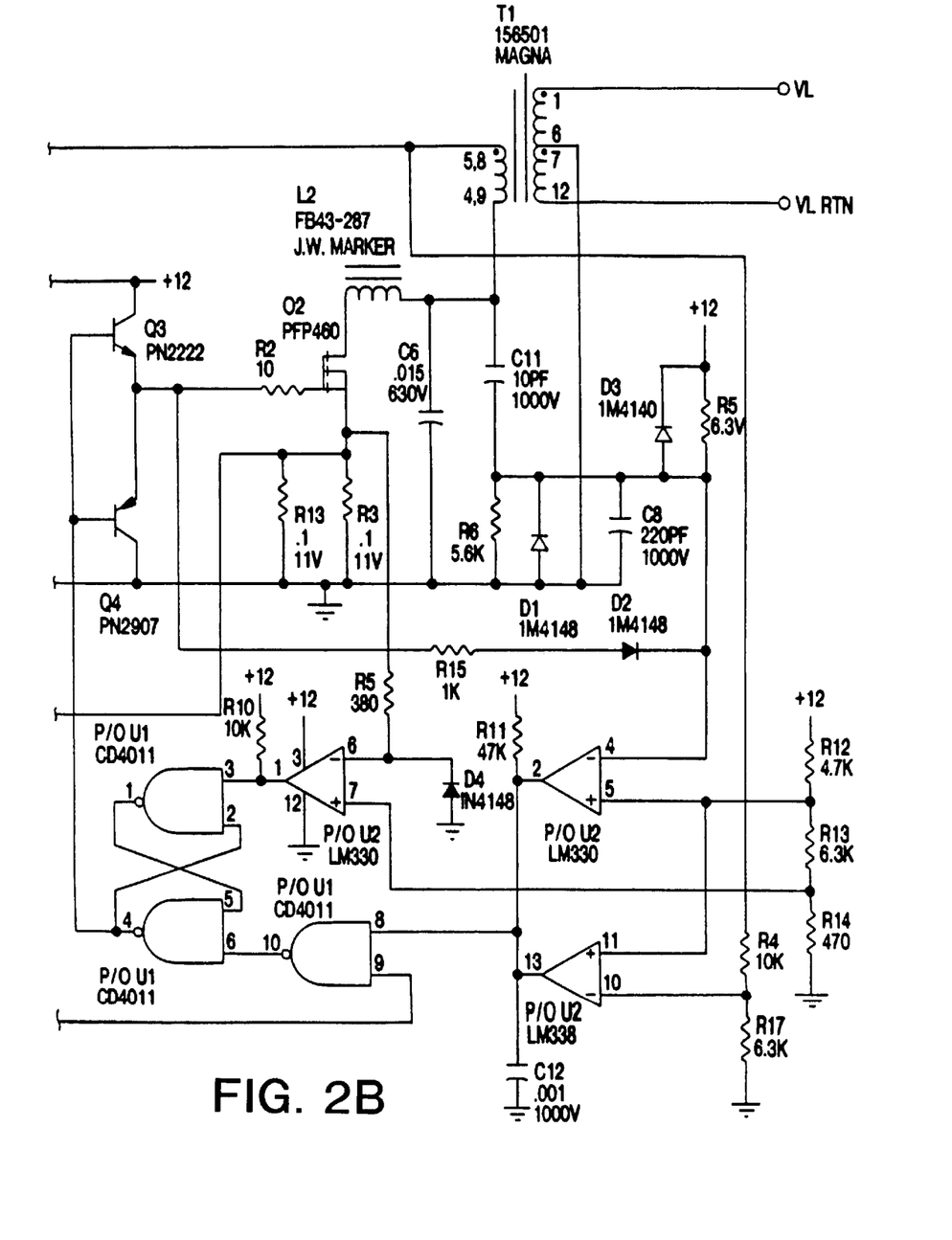

The Applicants have used circuits like that in FIGS. 2A and 2B to generate pulses. varying the component specifications changes the respective primary and secondary pulse widths. The rise time and peak voltage of the voltage pulse to the lamp is controlled by capacitor C6 plus the sum of the parasitic capacitance associated with the transformer's secondary winding, the lamp and it wiring and the peak current developed in the primary of transformer T1 during the conduction cycle of Q2. When Q2 turns off, the current flowing in the primary continues to flow into capacitor C6 in parallel with the parasitic capacitance. This results in a sinusoidal increase in voltage which continues until the lamp ignites at which point the lamp presents a low impedance across the output of the transformer. The charge stored in capacitor C6 and the parasitic capacitances now discharge through the lamp. The rise time of the current pulse is determined by the resistance of the transformer windings and the leakage inductance of transformer T1 secondary as well as the total value of capacitance. The discharge continues until the capacitor's C6 voltage as stepped up by the transformer T1 is not sufficient to maintain current through the lamp greater than what the stored energy in the transformer core can maintain. At this point the energy stored in the transformer is transferred to the lamp resulting in a secondary current pulse of longer duration than the primary pulse. Whereas the primary pulse time constant is controlled by the leakage inductance and winding resistance, the secondary current pulse time constant is controlled by the secondary inductance and the lamp voltage. This results in a relatively long secondary current pulse versus the much shorter primary current pulse.

The amount of energy that is contained in the primary pulse versus the secondary pulse is determined by the amount of energy that gets transferred from the transformer T1 to the capacitors described above before the lamp lights. Adjusting the value of C6 so that the lamp lights at the point at which all the energy from the transformer has been transferred tot the capacitor results in most of the energy being contained in the primary pulse. Conversely, adjusting the value of C6 such that the lamp ignition occurs prior to all the energy transferred to C6 results in an increasing energy content in the secondary pulse. Depending upon the ratio of capacitor to transformer stored energy at the time of lamp ignition. Similarly adjusting C6 such that lamp ignition occurs after all the energy has been transferred to the capacitor and the energy has started transferring back to the transformer results in an increasing energy content of the secondary pulse.

Figure 3:
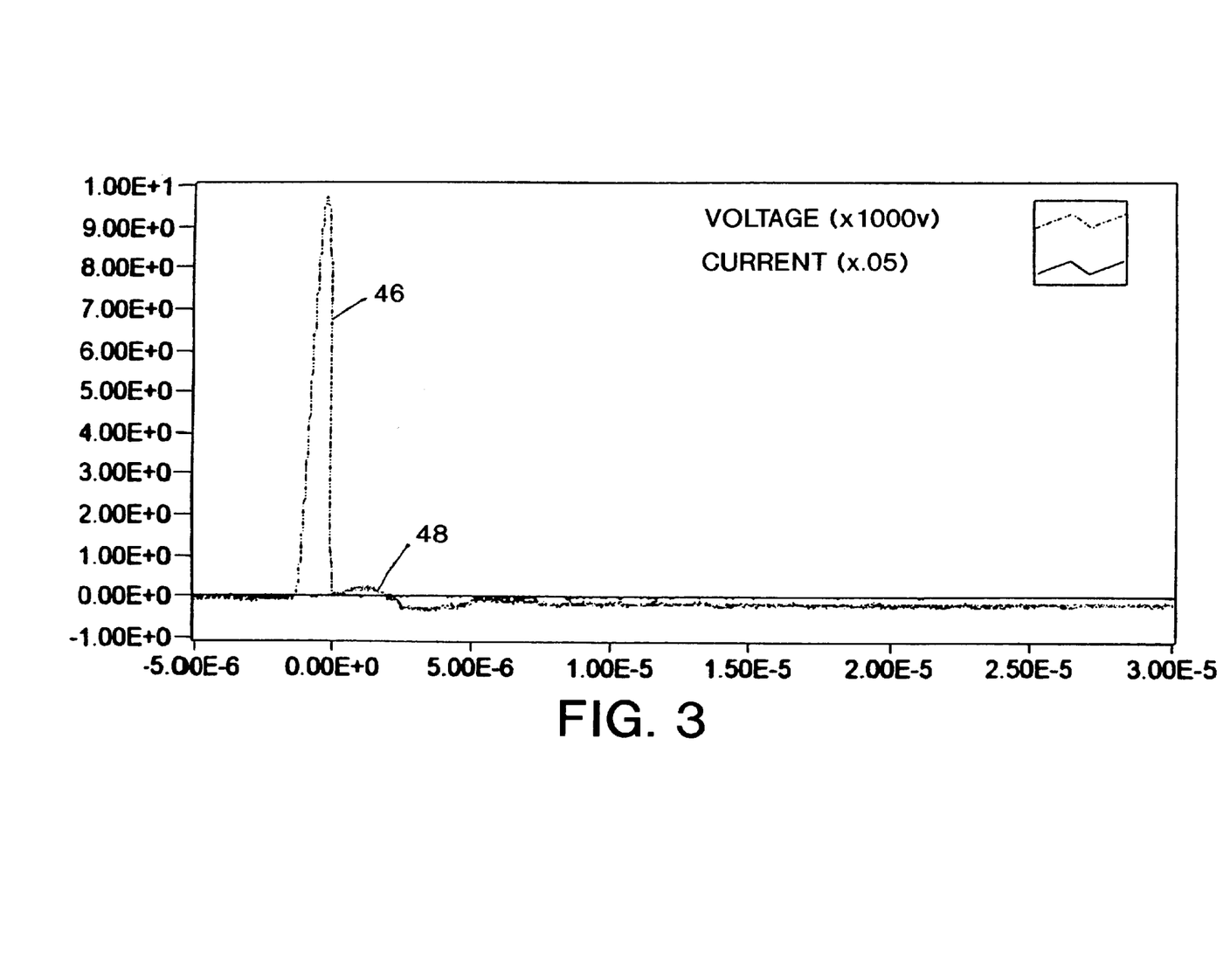
FIG. 3 shows a voltage time chart of an applied power pulse.

FIG. 3 shows a voltage time chart of an applied power pulse. The chart is for the preferred electrical pulse for a 15.24 centimeter (6 inch), 100 torr pressure, phosphor (YGC) coated, neon lamp run at approximately 4 to 6 watts. The first portion, primary pulse 46, has a high, although narrow peak that is generally prior in time. The second portion, secondary pulse 48, has a much lower peak, generally somewhat later in time, but it extends over a greater period of time. Here, the secondary pulse portion 48 is almost zero. Pulse width may be defined as the width about the peak to the points on either side having half the peak amplitude value. Applicants prefer a pulse rise of about 50,000 volts or more per microsecond for a duration of about 70 nanoseconds. The voltage rise factor shown in FIG. 3 is about 132,000 volts per microsecond, for about 70 nanoseconds.

The primary pulse 46 is designed in part to accommodate the characteristics of the lamp diameter, fill gas, fill gas pressure, and electrodes. The primary pulse 46 is designed to be sufficient to ionize the lamp so there is electrical conduction, and to further energize neutral (ground state) neon atoms to their first energy levels. The excited neon can then emit ultraviolet radiation, which in turn causes the phosphor 26 to emit visible light. The primary pulse 46 is then chosen to effectively stimulate the phosphor 26 to emit visible light. It is generally, understood that an insufficient primary pulse 46 results in no ignition, while too great a primary pulse results in excessive electrode wear, electromagnetic lamp noise and similar problems. Within these constraints, a designer has opportunity to design the primary pulse 46. It should be understood that producing shorter primary pulses is more effective at stimulating the phosphor, (Some neon visible red occurs with just a primary pulse.), but shorter pulses are electronically more difficult (expensive) to form. It should also be understood that while white light can be generated from the primary pulse alone, and that no secondary pulse is inherently required. However, operation in this fashion can be inefficient for total light output.

In operation with the YGC phosphor, a primary pulse of about 70 nanoseconds was used, and substantially no secondary pulse was needed. There was sufficient red produced as a by product of the primary pulse, that no additional red was needed. With an alternative phosphor, for example one more blue, or one more efficient in responsive to the neon ultraviolet, the lamp efficiency may be increased by using a secondary pulse to increase the neon visible red production. The secondary pulse is then extended to stimulate the neon fill to emit more visible red light. This balancing is done to assure white light production. With insufficient secondary pulse width, the visible neon reds can be underdeveloped, so the lamp color is dominated by the stimulated phosphor emissions. With too long a secondary pulse, the lamp color is dominated by the visible neon reds. Due to emission duration, and spatial separations, and depending on the timing between the primary pulse and secondary pulse, there may be actual time delays between the several color emissions. The lamp can be said to be flashing first with the phosphor green blue color, along with any by product red resulting from the first pulse, and then, very shortly thereafter flashing with the neon red color. (There may also be emission overlaps.) Since these separate emissions occur faster than a human eye can detect, they are integrated by the eye as one color. In particular, the green blue and red are integrated forming a white color.

The preferred pulse is followed by an off period. The best off period following the secondary pulse is long enough to let enough of the neon to return to neutral ground state so that the next primary pulse can properly populate the low energy levels for subsequent UV emission. A few microseconds is sufficient.

Figure 4:
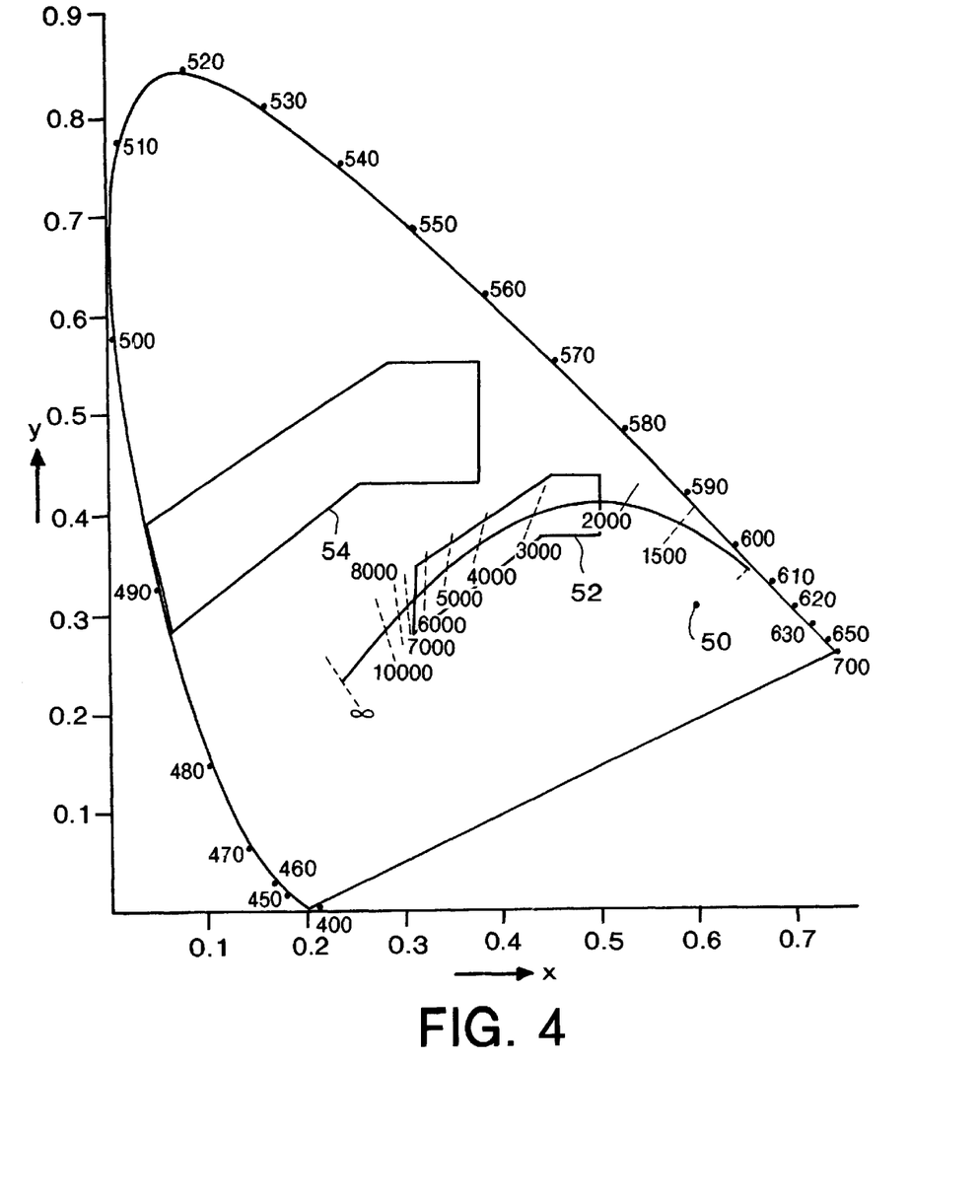
FIG. 4 shows a color coordinate chart.

FIG. 4 shows a color coordinate chart. The color coordinates of neon (pulse excitation) are shown by one example at 50 (0.623, 0.326). It should be understood that the color coordinates of neon can be shifted by pressure variations, and selective excitation of particular energy levels as previously taught by the Applicants. The SAE defined white region 52 is also outlined. To achieve a white output, the neon color must be combined with a phosphor (or phosphors) color(s) stimulated by the neon ultraviolet emissions such that the vector combination ends up in the SAE white region 52. This combination depends in part on the relative intensities of the emitted light, and the final transmission from the lamp. If an equal amount of phosphor emission is to be combined with the neon emission, then a phosphor with an color from the region 54 defined by the coordinates {(0.003, 0.238), (0.003, 0.370), (0.283, 0.554), (0.377, 0.554), (0.377, 0.434), (0.257, 0.434)} should be chosen. The vector sum of the neon color coordinate and the phosphor color coordinate then ends in the SAE white zone 52.

In general, to achieve white emission from a neon, phosphor coated lamp, the neon pressure and stimulation should be chosen to yield neon visible emission coordinates of (P,Q), for example (0.623, 0.326), a phosphor should be chosen excitable by neon ultraviolet emission to emit visible light with color coordinates (X,Y) (provided they are possible values); given that the relative intensity of the phosphor visible emission compared to relative intensity of the neon visible emission can be rated as I. This depends in part on the efficiency of the phosphor, and the depth of the phosphor for light generation, and for light blockage. The selection is then made such that I*(X,Y)+(P,Q) falls within the defined white region, for example the SAE white region 52 {(0.310, 0.282); (0.310, 0.348); (0.453, 0.440); (0.500, 0.440); (0.500, 0.380) and (0.440, 0.380)}.

One sample phosphor, YGC 13, had a molar composition of $(Y_{2.92}:Al_3Ga_2O_{12}:Ce_{0.01})$, was fired at 1500 degrees. It had a green blue output with a peak excitation at about 341 nanometers. When YGC 13 was used in a neon lamp, the lamp yielded 19,930 candelas per meter squared. For comparison, a similar 6 inch, uncoated neon lamp yielded about 19,000 candelas per meter square (spot metering at the neon arc center). The neon lamp coated with YGC 13 had visible light color coordinate values of X=0.501 and Y=0.440. This is close to being SAE white.

A YGC phosphor, sample 18A, had a molar composition of $(Y_{2.92}:Al_3Ga_2O_{12}:Ce_{0.01})$. The YGC 18A phosphor was fired by the steps of first firing in an alumina crucible at 1575 degrees Celsius for 6 hours in air. This was followed by a firing while under a linear temperature incline starting at 500 and rising to 1575 degrees Celsius over 3 hours. The phosphor was then held at 1575 degrees Celsius for 6 hours. This was followed by a firing while under a linear temperature decline starting at 1575 and falling to 500 degrees Celsius over 2 hours. The phosphor was then held for cooling, broken up and sieved at 400 mesh. The YGC 18A phosphor was tested in a neon lamp and yielded 17,080 candelas per meter squared with color coordinates in one sample of (0.498, 0.439) thereby qualifying as SAE white. In a second sample the point (0.503, 0.441) was achieved slightly missing the SAE white.

A YGC phosphor, sample 18D, had a molar composition of $(Y_{2.92}:Al_3Ga_2O_{12}:Ce_{0.01})$. The YGC 18D phosphor was fired by the steps of first firing in an alumina crucible at 1650 degrees Celsius for 6 hours in air. This was followed by a firing while under a linear temperature incline starting at 500 and rising to 1650 degrees Celsius over 3 hours. The phosphor was then held at 1650 degrees Celsius for 6 hours. This was followed by a firing while under a linear temperature decline starting at 1650 and falling to 500 degrees Celsius over 2 hours. The phosphor was then held for cooling, broken up and sieved at 400 mesh. The YGC 18D was tested in the neon lamp and yielded 17,050 candelas per meter squared (spot metering near the lamp axis) with color coordinates of (0.500, 0.439) thereby qualifying as SAE white.

In a working example some of the lamp dimensions were approximately as follows: The tubular envelope was made of 1724 hard glass, and had a tubular wall with an lighted length of 15.24 centimeters (6 inches), an inside diameter of 3.0 millimeters, a wall thickness of 1.0 millimeters and an outside diameter of 5.0. Lamps with 5.0 millimeter inside diameters and 7.0 millimeter outside diameters have also been made. The electrodes were made of molybdenum shafts supporting crimped on nickel cups, or tantalum cups. Each nickel cup was coated with an alumina and zirconium getter material, known as Sylvania 8488. The molybdenum rod had a diameter of 0.508 millimeter (0.020 inch). The exterior end of the molybdenum rod was butt welded to a thicker (about 1.0 millimeter) outer rod. The inner end of the outer rod extended into the sealed tube about 2 or 3 millimeters. The thicker outer rod is more able to endure bending, than the thinner inner electrode support rod. The cup lip extended about 2.0 millimeters farther into the envelope than did the rod. The inside surface of the envelope was coated with a yttrium, alumina, gallium and ceria phosphor, the formulation being YGC phosphor fired by the YGC 18D procedure.

In summary the best pressure to meet the SAE white chromaticity is from 20 to 220 Torr of pure neon, depending in part on the lamp length. The best pressure for electrical efficiency is as small as possible, while the best pressure for sputtering control is greater than 50 Torr and preferably 70 Torr to 150 Torr, and more preferably at about 100 Torr. The best frequency for candela efficiency is from 12 to 17 kHz for a 15.24 centimeter (6 inch) long lamp. The preferred frequency is 15.5 kHz. It is understood that a sufficient amount of energy is necessary to be applied for a chosen duty cycle to ionize the lamp, and that a sharp crest in the applied primary pulse is preferred. While the best practical system frequency is just above the limit of most human hearing or about 20 kHz. The best primary pulse width for candela efficiency is below 400 nanoseconds, and more preferably in the range below 100 nanoseconds. The pulse used here to generate white light with the YGC phosphor had a pulse duration of about 50 to 70 nanoseconds, a voltage peak of about 9500 volts, at a frequency of about 15 kHz. Sufficient red was produced in the primary pulse stimulation that no secondary pulse was necessary. The lamp was operated at about 7 watts, and generated 140 lumens for about 20 lumens per watt, producing an SAE white light output. To minimize the red input, no secondary pulse was used.

The preferred phosphor coating had a depth of about 40 microns achieved with two or three coats of from 15 to 20 microns each. The disclosed operating conditions, dimensions, configurations and embodiments are as examples only, and other suitable configurations and relations may be used to implement the invention.

While there have been shown and described what are at present considered to be the preferred embodiments of the invention, it will be apparent to those skilled in the art that various changes and modifications can be made herein without departing from the scope of the invention defined by the appended claims.

What is claimed is:

1. A fluorescent lamp providing white light comprising: a light transmissive lamp tube having an enclosed volume, and one or more electrodes in contact with the enclosed volume;

a substantially pure neon fill with no mercury enclosed in the enclosed volume, emitting an ultraviolet light and a visible light with color coordinates (P,Q); and a phosphor coating having a visible light emission with color coordinates (X,Y) excited by the neon ultraviolet emission; the relative intensity I of the induced phosphor visible emission compared to the intensity of the neon visible emission being such that I*(X,Y)+(P,Q) falls within the defined white region {(0.310, 0.282); (0.310, 0.348); (0.453, 0.440); (0.500, 0.440): (0.500, 0.380) and (0.440, 0.380)} wherein the phosphor has a composition of comprising Yttrium, Aluminum, Gallium, Oxygen and Cerium.

2. The lamp in claim 1, wherein the phosphor has been fired by the steps of firing in an alumina crucible between 1650 degrees Celsius to 1575 degrees Celsius: 6 hours in air; 500 to 1650 degrees in 3 hours linear incline comes back down to 500 degrees in 3 to 4 hours.

3. A fluorescent lamp providing white light comprising:

a light transmissive lamp tube having a light transmissive envelope defining an enclosed volume, and one or more electrodes in contact with the enclosed volume;

a substantially pure neon fill with no mercury, enclosed in the enclosed volume, emitting ultraviolet light and visible light; and a phosphor coating the envelope, and having a composition of $Y_a:Al_3Ga_2O_{12}:Ce_d$ (where a=about 3, and 0.0<d<0.1).

4. The lamp in claim 3, wherein the phosphor a composition consisting essentially of $Y_{2.92}:Al_3Ga_2O_{12}:Ce_{0.01}$.

5. The lamp in claim 3, wherein the phosphor comprises more than two layers of from 15 to 20 microns per layer.

6. A fluorescent lamp providing white light comprising:

a light transmissive lamp tube having a light transmissive envelope defining an enclosed volume, and one or more electrodes in contact with the enclosed volume;

a substantially pure neon fill with no mercury, enclosed in the enclosed volume, emitting ultraviolet light and visible light; and a phosphor coating the envelope, and having a composition of $Y_aLu_bSc_c:Al_3Ga_2O_{12}:Ce_d$ (where a+b+c=3, and 0.0<d<0.1).

7. A phosphor excitable by neon discharge emissions consisting essentially of a composition Of $Y_a:Al_3Ga_2O_{12}:Ce_d$, where a=about 3, and 0.0<d<0.1).

8. The phosphor in claim 7, wherein the phosphor consisting essentially of a composition Of $Y_{2.92}:Al_3Ga_2O_{12}:Ce_{0.01}$.

9. A phosphor excitable by neon discharge emissions consisting essentially of a composition of $Y_aLu_bSc_c:Al_3Ga_2O_{12}:Ce_d$ (where a+b+c=3, and 0.0<d<0.1).

* * * * *